(12) United States Patent
Neagu et al.

(10) Patent No.: US 8,762,291 B2
(45) Date of Patent: Jun. 24, 2014

(54) ROBUST OPTIMIZATION OF BULK GAS DISTRIBUTION

(75) Inventors: Nicoleta Neagu, Verrieres le Buisson (FR); Hugues Dubedout, Vanves (FR)

(73) Assignee: L'Air Liquide, Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 753 days.

(21) Appl. No.: 12/914,241

(22) Filed: Oct. 28, 2010

(65) Prior Publication Data

US 2011/0307407 A1 Dec. 15, 2011

Related U.S. Application Data

(60) Provisional application No. 61/354,629, filed on Jun. 14, 2010.

(51) Int. Cl.
*G06Q 30/00* (2012.01)
(52) U.S. Cl.
USPC ........... 705/337; 705/7.26; 705/332; 705/338
(58) Field of Classification Search
CPC .................... G06Q 10/08; G06Q 10/06316
USPC .............. 705/332, 337, 7.26, 7.22, 7.12
See application file for complete search history.

(56) References Cited

U.S. PATENT DOCUMENTS

| | | | | |
|---|---|---|---|---|
| 7,251,612 B1* | 7/2007 | Parker et al. | ................. | 705/7.22 |
| 7,516,082 B2* | 4/2009 | Sanville et al. | .............. | 705/7.26 |
| 2002/0026342 A1* | 2/2002 | Lane et al. | ......................... | 705/8 |
| 2004/0034556 A1* | 2/2004 | Matheson et al. | ................ | 705/8 |
| 2004/0220844 A1* | 11/2004 | Sanville et al. | .................... | 705/8 |
| 2005/0288986 A1* | 12/2005 | Barts et al. | ....................... | 705/9 |
| 2006/0224423 A1* | 10/2006 | Sun et al. | ......................... | 705/7 |
| 2008/0010357 A1* | 1/2008 | Ye et al. | ....................... | 709/207 |
| 2008/0294484 A1* | 11/2008 | Furman et al. | ................... | 705/8 |
| 2009/0222123 A1* | 9/2009 | Nevills et al. | ................ | 700/104 |
| 2010/0042527 A1* | 2/2010 | Mitchell et al. | ................ | 705/35 |
| 2010/0088142 A1* | 4/2010 | El-Bakry et al. | ................ | 705/8 |
| 2010/0332273 A1* | 12/2010 | Balasubramanian et al. | .... | 705/7 |
| 2011/0173042 A1* | 7/2011 | Riepshoff et al. | ............ | 705/7.26 |
| 2011/0246274 A1* | 10/2011 | Mesaros | .................... | 705/14.19 |
| 2011/0307407 A1* | 12/2011 | Neagu et al. | .................. | 705/337 |

OTHER PUBLICATIONS

"Heuristic Algorithms for Solving Uncertain Routing-Scheduling Problem," by Jerzy Jozefcyzk and Michal Markowski, published by Artificial Intelligence and Soft Computing—ICAISC 2008 Lecture Notes in Computer Science vol. 5097, 2008, pp. 1052-1063.*
"Agent-Based Simulation for Logistics and Plant Management," published by Agentlink in Nov. 2005, pp. 1-9.*

(Continued)

*Primary Examiner* — Brian Epstein
(74) *Attorney, Agent, or Firm* — Elwood L. Haynes

(57) ABSTRACT

Techniques are disclosed for increasing the robustness of optimization solutions for bulk gas distribution, relative to uncertain events such as unexpected plant outages. The techniques actively consider different assumptions regarding unexpected plant outages while searching for a solution (i.e., when generating a delivery schedule). A robust solution (delivery schedule) is one on which a plant outage only has a limited impact. A computer-implemented delivery scheduling application may identify a robust solution that performs well with respect to a range of uncertain future conditions (e.g., a variety of plant outages), at the lowest additional cost to the producer/distributor relative to other solutions.

15 Claims, 6 Drawing Sheets

(56) References Cited

OTHER PUBLICATIONS

PCT/IB2011/002007, International Search Report and Written Opinion, issued Dec. 2, 2011.

Notice from the European Patent Office dated Oct. 1, 2007 concerning business methods.

T.F. Abdelmaguid, M.M. Dessouky: "A Genetic Algorithm Approach to the Integrated Inventory-Distribution Problem" International Journal of Production Research 44 (21) pp. 4445-4464 (2006).

T.F. Abdelmaguid, M.M. Dessouky, F. Ordonez: "Heuristic Approaches for the Inventory Routing Distribution Problem", Computers Industrial Engineering 56, pp. 1519-1534 (2009).

D. Adelman: "A Price-Directed Approach to Stochastic Inventory Problem", Operation Research 52, pp. 499-514 (2004).

E.H. Aghezzaf: "Robust Distribution Planning for Supplier-Managed Inventory Agreements When Demand Rates and Travel Times Are Stationary", Journal of the Operational Research Society 59, pp. 1055-1065 (2008).

H. Andersson, A. Hoff, M. Christiansen, G. Hasle, A. Lokkentangen: "Industrial Aspect and Literature Survey: Combined Inventory Management and Routing", Computers and Operation Research 37, pp. 1515-1536 (2010).

J.F. Bard, L. Huang, P. Jaillet, and M. Dror: "A Decomposition Approach to the Inventory Routing Problem With Satellite Facilities", Transportation Science 32, pp. 189-203 (1998).

W. Bell, L. Dalberto, M. Fisher, A. Greenfield, R. Jaikumar, P. Kedia, R. Mack P. Prutzman: "Improving the Distribution of Industrial Gases with an On-Line Computerized Routing and Scheduling Optimizer", Interfaces 13, pp. 4-23 ( 1983).

T. Benoist, B. Estellon, F. Gardi, A. Jeanjean: "High-performance local search for real-life inventory routing", Transportation Science (2009).

D. Bertsimas, M. Sim: "The Price of Robustness", Operation Research vol. 52, No. 1, pp. 35-53 (2004).

A.M Campbell, L. Clarke, A. Kleywegt, M.W.P. Salvesberg: "The Inventory Routing Problem", Fleet Management and Logistics, T.G. Crainic and G. Laporte (eds) pp. 95-113, Kluwer, Boston ( 1998).

T. Chien, A. Balakrihnan, R. Wong: "An Integrated Inventory Allocation and Vehicle Routing Problem", Transportation Science 23 pp. 67-76 (1989).

M. Christiansen: "Decomposition of a Combined Inventory and Time Constrained Ship Routing Problem", Transportation Science 33, pp. 3-16 (1999).

M. Dror, M. Ball, B. Golden: "Computational Comparison of Algorithms for the Inventory Routing Problem", Anal of Operation Research 4, pp. 3-23, (1985).

P Jaillet, JR Bard, L Huang, M Dror: "Delivery Cost Approximations for Inventory Routing Problems in a Rolling Horizon Framework", Transportation Science 36:33, pp. 292-300, (2002).

AJ. Kleywegt, V.S. Nod, M.W. Savelsbergh: "Dynamic Programming Approximation for a Stochastic Inventory Routing Problem", Transportation Science 38, pp. 42-70 (2004).

AJ. Kleywegt, V.S. Nod, M.W. Savelsbergh: "The Stochastic Inventory Routing Problem With Direct Deliveries", Transportation Science 36, pp. 94-118 (2002).

P. Kouvelis and G. Yu: "Robust Discrete Optimization and its Applications", Chapter 1, Kluwer Academic Publisher (1997).

N.H Moin S. Sahli, N.A.B Aziz: "An Efficient Hybrid Genetic Algorithm for the Multi Product Multi Period Inventory Routing Problem", International Journal of Production Economics, Accepted Paper (2010).

M.W.P. Savelsbergh, J-H. Song: "An Optimization Algorithm for the Inventory Routing Problem With Continuous Moves", Computers & Operations Research 35 pp. 2266-2282. (2008).

M.W.P. Savelsbergh, J-H Song: "Inventory Routing with Continuous moves", Computers & Operation Research 34, pp. 1744-1763 ( 2006 ).

O. Solyali, J.F. Cordeau, G. Laporte: "Robust Inventory Routing under Demand Uncertainty", Submitted Paper (2010).

A.L. Soyster: "Convex Programming with Set-Inclusive Constraints and Application to inexact Linear Programming", Operation Research 21, pp. 1154-1157 (1973).

* cited by examiner

ROBUST OPTIMIZATION OF BULK GAS DISTRIBUTION

CROSS REFERENCE TO RELATED APPLICATION

This application claims priority to U.S. Provisional Patent Application 61/354,629 filed on Jun. 14, 2010, which is hereby incorporated by reference in its entirety.

BACKGROUND

A supply chain is generally used to refer to a system of organizations, people, technology, activities, information and resources involved in moving products (e.g., raw materials such as industrial gases) from one point (such as a manufacturer's facility) to another (such as a customer's distribution or manufacturing center). For example, a supply chain may be used to describe the production and delivery of industrial gases in bulk to tanks at a customer site. In such a supply chain, a producer may generate product using an air separation unit (ASU) to separate atmospheric air into gaseous components (e.g., oxygen gas ($O_2$), nitrogen gas ($N_2$), hydrogen gas ($H_2$), Argon gas (Ar)), as well as produce mixtures of these molecular gases. Elements of this supply chain (i.e., the production, storage, and delivery of industrial gases) itself may be a component of other supply chains for the customers where the product is then delivered. That is, a customer may use the industrial gases in manufacturing or other production activities, resulting in the creation and distribution of products to other customers.

Gases refined using an ASU may be stored in tanks prior to being delivered to customers. For example, gases may be stored in tanks at the production site (or transported over a pipeline to tanks at a storage facility). From there, a delivery truck obtains product for bulk delivery to customers.

A producer/distributor of industrial gases typically faces a variety of transportation logistics and distribution problems in managing a bulk-delivery supply chain. Overall, the producer/distributor would like to use the resources of their distribution network in an optimal manner. For example, the producer/distributor would like to optimize bulk distribution, cylinder delivery and retrieval, production schedules, delivery schedules, etc.). Optimizing a supply chain for such a delivery and distribution network has proven to be a complex task. In particular, generating a delivery schedule that satisfies customer demand, minimizes global cost, and that is robust to outages in production proves to be a difficult challenge, as the number of combinatoric possibilities for creating a bulk-delivery schedule is very large. This fact makes it difficult for a producer/distributor to effectively determine a robust schedule for delivering products to a set of customers. At the same time, for even a moderately sized producer/distributor of industrial gases, creating a robust bulk delivery schedule can provide a substantial benefit.

SUMMARY

Embodiments of the invention provide a method for robust optimization of bulk gas distribution. One embodiment of the invention includes a method for generating a robust delivery schedule for delivering a commodity product to a set of customers. The method may generally include generating one or more outage scenarios. Each outage scenario specifies a period of time during which a first one of one or more production facilities is presumed to be non-operational. This method may further include generating a set of solutions. Each solution specifies a delivery schedule for delivering the commodity product to the set of customers and determining a cost for each solution relative to each generated scenario. This method may further include evaluating the cost of each solution according to a specified evaluation method to compute the robustness measure for each solution and returning, as the robust delivery schedule, a solution having a best determined cost versus robustness measure tradeoff, relative to other solutions in the generated set of solutions.

Still another embodiment of the invention includes a computer-readable storage medium containing a delivery scheduling application, which when executed on a processor performs an operation for generating a robust delivery schedule for delivering a commodity product to a set of customers. The operation itself may generally include generating one or more outage scenarios. Each outage scenario specifies a period of time during which a first one of one or more production facilities is presumed to be non-operational. This operation may further include generating a set of solutions. Each solution specifies a delivery schedule for delivering the commodity product to the set of customers and determining a cost for each solution relative to each generated scenario. This operation may further include evaluating the cost of each solution according to a specified evaluation operation to compute the a robustness measure for each solution and returning, as the robust delivery schedule, a solution having a best determined cost versus robustness measure tradeoff, relative to other solutions in the generated set of solutions.

Yet another embodiment of the invention includes a system having a processor and a memory storing a delivery scheduling application, which when executed on the processor performs an operation for generating a robust delivery schedule for delivering a commodity product to a set of customers. The operation generally include generating one or more outage scenarios. Each outage scenario specifies a period of time during which a first one of one or more production facilities is presumed to be non-operational. This operation may further include generating a set of solutions. Each solution specifies a delivery schedule for delivering the commodity product to the set of customers and determining a cost for each solution relative to each generated scenario. This operation may further include evaluating the cost of each solution according to a specified evaluation operation to compute the robustness measure for each solution and returning, as the robust delivery schedule, a solution having a best determined cost versus robustness measure tradeoff, relative to other solutions in the generated set of solutions.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers.

DESCRIPTION OF PREFERRED EMBODIMENTS

Figure 1:
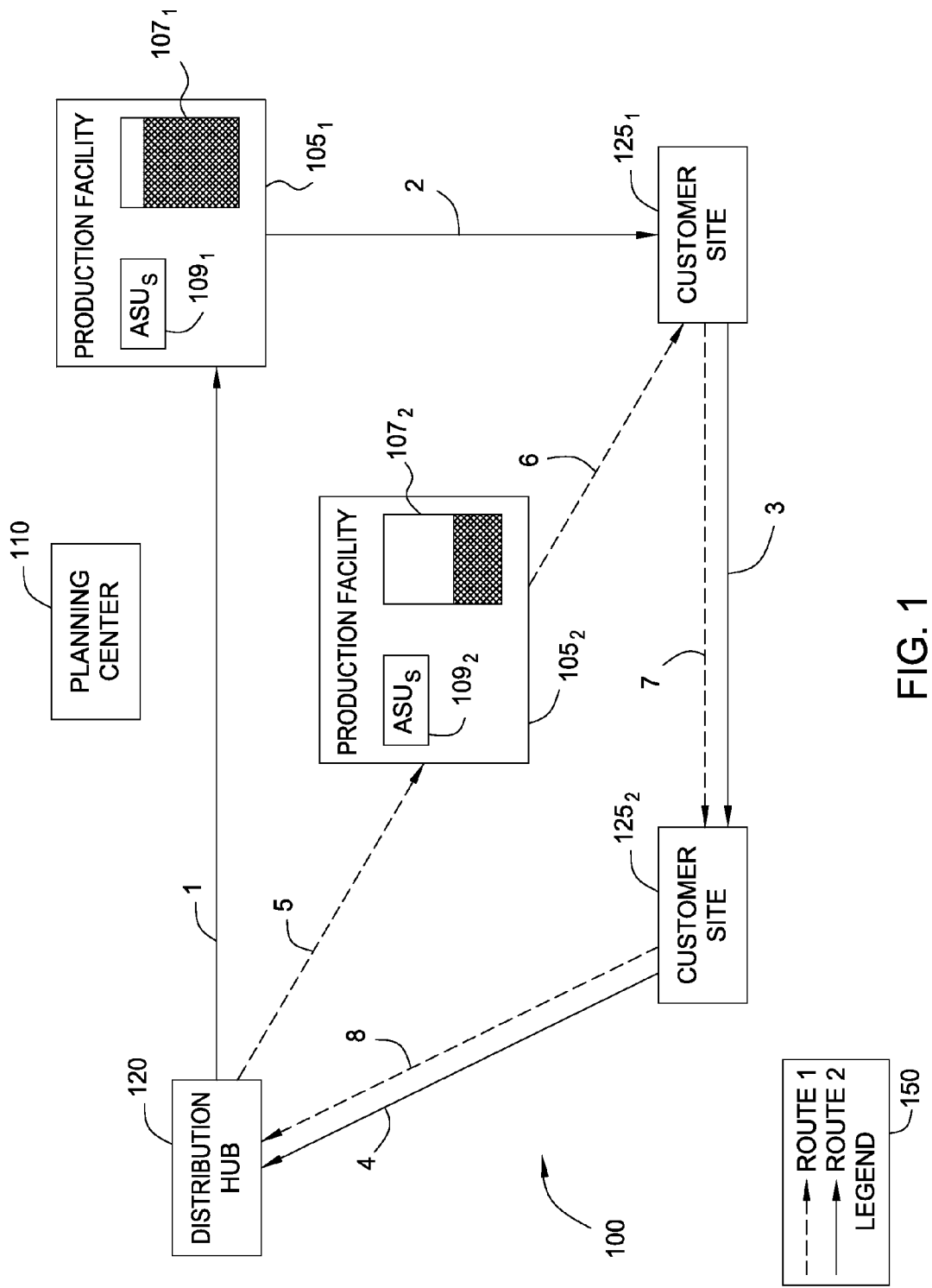
FIG. 1 illustrates an example of different delivery schedules for bulk gas distribution, according to one embodiment of the invention.

As described in greater detail below, embodiments of the invention provide a computer-implemented delivery planning application configured to generate a schedule (e.g., a two-week schedule) for delivering a commodity product to multiple customers (e.g., bulk delivery of industrial gasses). A producer (or distributor) may periodically use the delivery planning application to create a robust delivery schedule, which, in turn, reduces overall delivery costs as unplanned outages occur.

Thus, embodiments of the invention increase the robustness of optimization solutions for bulk gas distribution relative to uncertain events such as unexpected plant outages. The methods actively consider different assumptions regarding unexpected plant outages while searching for a solution (i.e., when generating a delivery schedule). A robust solution (delivery schedule) is one on which a plant outage only has a limited impact. However, most of the time, a robust solution will have a higher cost that a non-robust solution. For example, assume a non-robust delivery schedule has a cost of $15,000 over two weeks, but an extra cost of $5000 in case of plant outage. In such a case, a more robust solution might be identified that has cost of $16,000 over two-weeks if no outage occurs, and an extra cost of $1000 if an outage did occur. Thus, the second solution is considered more robust, as the impact of an outage is significantly reduced, while only marginally increasing the cost over the two-week period.

In one embodiment, the delivery scheduling application may identify a robust solution that performs well with respect to a range of uncertain future conditions (e.g., a variety of plant outages), at the lowest additional cost to the producer/distributor relative to other solutions. More specifically, the delivery scheduling application may search for a robust solution that performs relatively well across a variety of realizations of uncertainty, without attempting to assign an assumed probability distribution related to plant outages (or other disruptions). Instead, the delivery scheduling application generates a variety of scenarios with respect to possible, realistic plant outages. The delivery scheduling application may employ a combinatorial optimization model which considers non-periodical production and demand forecast, inventory levels, customers' orders, routing, transport equipment availability and driver and power unit availability. Doing so allows the delivery scheduling application to build robust solutions—routes and schedules to deliver bulk clients—which are less vulnerable to the uncertainty of plant outages. The uncertainty occurs in the form of randomness in plant outage occurrence and its duration: a plant might go in plant outage for a certain time, which stops the production and affects the inventory level of the storage tanks at the production facility. Embodiments of the invention provide a search strategy for more robust solutions by considering a set of realistic scenarios as well as a technique for classifying solutions according to their robustness, relative to plant outages. In one embodiment, the methodology for classifying the robustness of a solution may be based on the known approaches of min-max and min-max regret criteria.

Note, as described, the bulk optimization problem is to optimize the distribution costs for a producer/distributor in making deliveries to clients with gas in bulk. Thus, in that context, an embodiment of the invention is described which is configured to determine multi-loading trips with the objective to minimize the total distribution cost (transport cost, structure cost) by considering logistic constraints such as resources availability, driver brakes, layovers, etc. However, it should be understood that embodiments of the invention may be applied to a broad variety of delivery scheduling optimization problems having comparable characteristics, e.g., such as cylinder distribution. Accordingly, the principal example of using the delivery scheduling application to generate a schedule for the delivery of bulk industrial gases is provided to be illustrative and not limiting.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified herein.

FIG. 1 illustrates a delivery distribution network 100, according to one embodiment of the invention. As shown, the network 100 includes a production facility $105_{1-2}$, a planning center 110, and a distribution hub 120 used to deliver bulk gas to two customer sites $125_{1-2}$. Production facility $105_{1-2}$ represents, for example, molecular gas generation plants that each include one or more air separation units (ASUs) $109_{1-2}$ used to distill industrial gases from the ambient atmosphere. In this example, each production facility $105_{1-2}$ includes a tank $107_{1-2}$ used to store product. Each tank $107_{1-2}$ shows an indication of how "full" the tank $107_{1-2}$ is using cross-hatching lines. Of course, the product generated by ASUs $109_{1-2}$ could be stored in locations other than the production facility $105_{1-2}$ itself. For example, a pipeline may connect a production facility 105 to a storage site.

The planning center 110 may generally be used to coordinate the activities of the production facilities $105_{1-2}$ and the filling distribution hub in delivering product to the customer sites $125_{1-5}$. For example, the planning center 110 may receive orders from the customers at customer sites $125_{1-5}$, schedule orders for delivery, as well as set and monitor production at the production facilities $105_{1-2}$. In one embodiment, personnel at the planning center 110 may periodically use a computer-implemented delivery application to generate a delivery schedule for making bulk deliveries to customers $125_{1-2}$.

As shown in FIG. 1, product may be delivered to customer sites $125_{1-2}$ using two alternative routes. A first route (labeled Route 1) includes segments 1, 2, 3, and 4. And a second route (labeled Route 2) includes segments 5, 6, 7, and 8. While both routes result in products being delivered to customer sties $125_{1-2}$, Route 2 is more robust than the Route 1. Route 2 may cost more than Route 1, due to the fact that production facility $105_1$ is situated at a further distance than production facility $105_2$. However, should a plant outage occur at production facility $105_2$, as production facility $105_1$ has more products in stock, Route 2 is less impacted by an outage. Therefore, Route 2 is more robust than Route 1. Customer sites $125_{1-2}$ represent a stop for a bulk delivery of industrial gasses. Customers at sites $125_{1-2}$ may have an on-site storage tank used to store the delivered gases. Further, the current (or expected) level in the tank may also help to determine a measure of robustness for a given delivery schedule. For example, if a customer has an unusually high inventory (or an unusually low forecasted demand) for a given delivery period, then a schedule that omits delivering additional product to that customer during an outage (allowing reserve product to be delivered to other customers) may be more robust (and less costly) than others. Accordingly, the producer/distributor may have access to an indication of the current product volumes in tanks at the customer sites $125_{1-2}$ and forecasted consumption for a delivery period. Such information may be provided to the planning center 110, where a delivery scheduling application may be configured to generate a robust delivery schedule.

Figure 2:
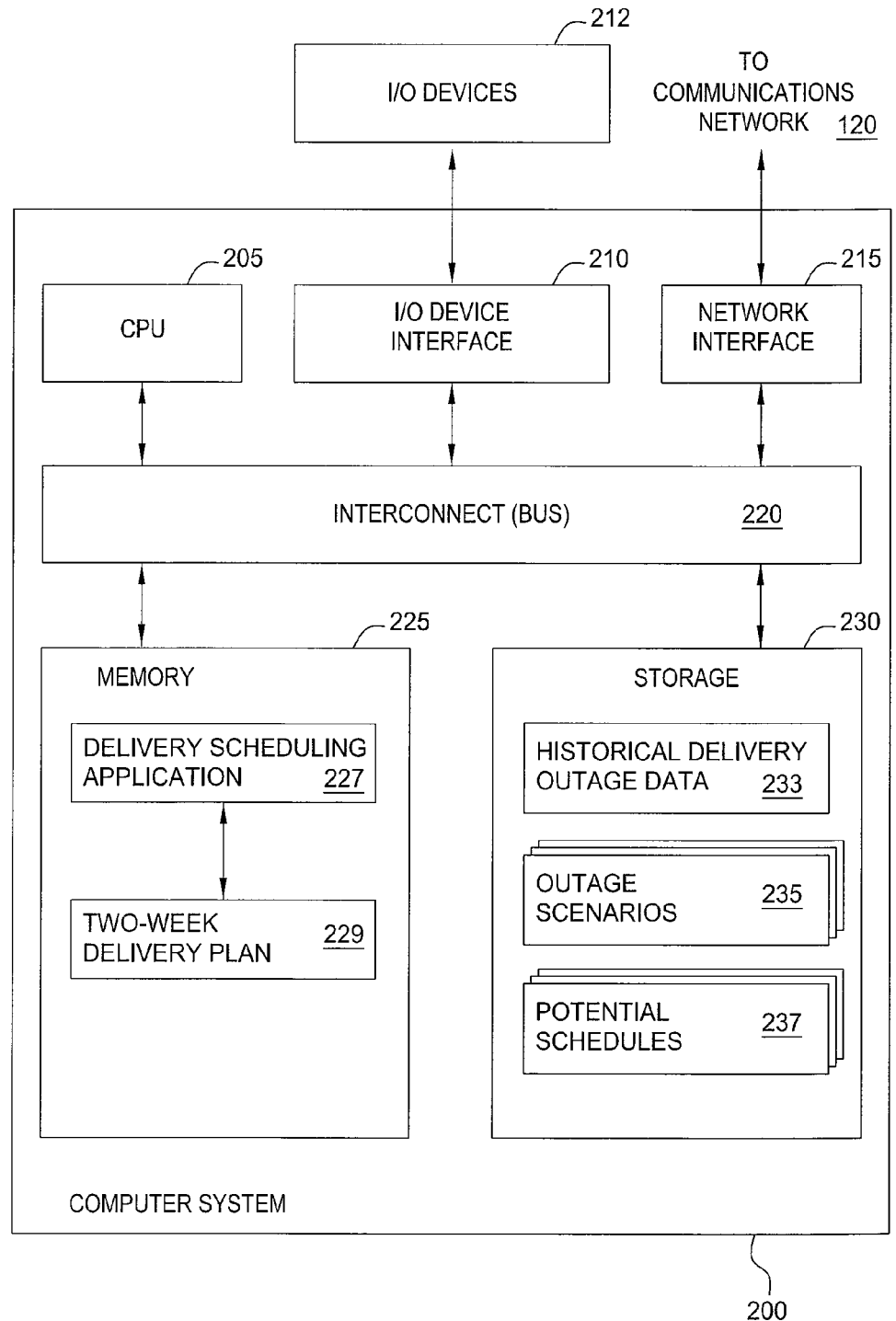
FIG. 2 is a view of a computing system which includes a delivery scheduling application, according to one embodiment of the invention.

FIG. 2 is a view of a computing system 200 that includes a delivery scheduling tool 227 configured to generate a robust delivery schedule, according to one embodiment of the invention. As shown, the computer system 200 includes, without limitation, a central processing unit (CPU) 205, a network interface 215, an interconnect 220, a memory 225, and storage 230. The computer system 200 may also include an I/O device interface 210 connecting I/O devices 212 (e.g., keyboard, display and mouse devices) to the computer system 200.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 contains a delivery scheduling application 227 and a two-week delivery plan 229, and the storage 230 contains historical delivery/outage data 233, outage scenarios 235 and potential schedules 237. The delivery scheduling application 227 provides a software application which allows a producer/distributor to generate a robust delivery schedule (i.e., two-week delivery plan 229) from a collection of data describing the delivery requirements for a set of customers, the resources available to a producer/distributor to make such deliveries, and potential disruptions to the production facilities of the producer/distributor (i.e., plant outages).

In one embodiment, delivery scheduling application 227 may generate a set of optional scenarios for plant outages (outage scenarios 235) based on the historical delivery/outage data 233. Accordingly, the historical delivery/outage data 233 may include information characterizing outages (or other disruptions) at the production facilities available to service a delivery schedule as well as past orders from customers, and current inventories at each production facility and the customers. The outage scenarios 235 may each specify a period of time during a two week delivery period where a production facility is presumed to be non-operational. The outage scenarios 233 may be generated based on a statistical evaluation of the historical delivery/outage data 233. For example, if outages at a plant have historically lasted for a minimum of two days, then the outage scenarios 235 for that plant should each be for at least a two day period. Similarly, if outages at another plant tend to be limited to six hours, then the outage scenarios 235 for this plant should be limited to six hours (or less).

Figure 5:
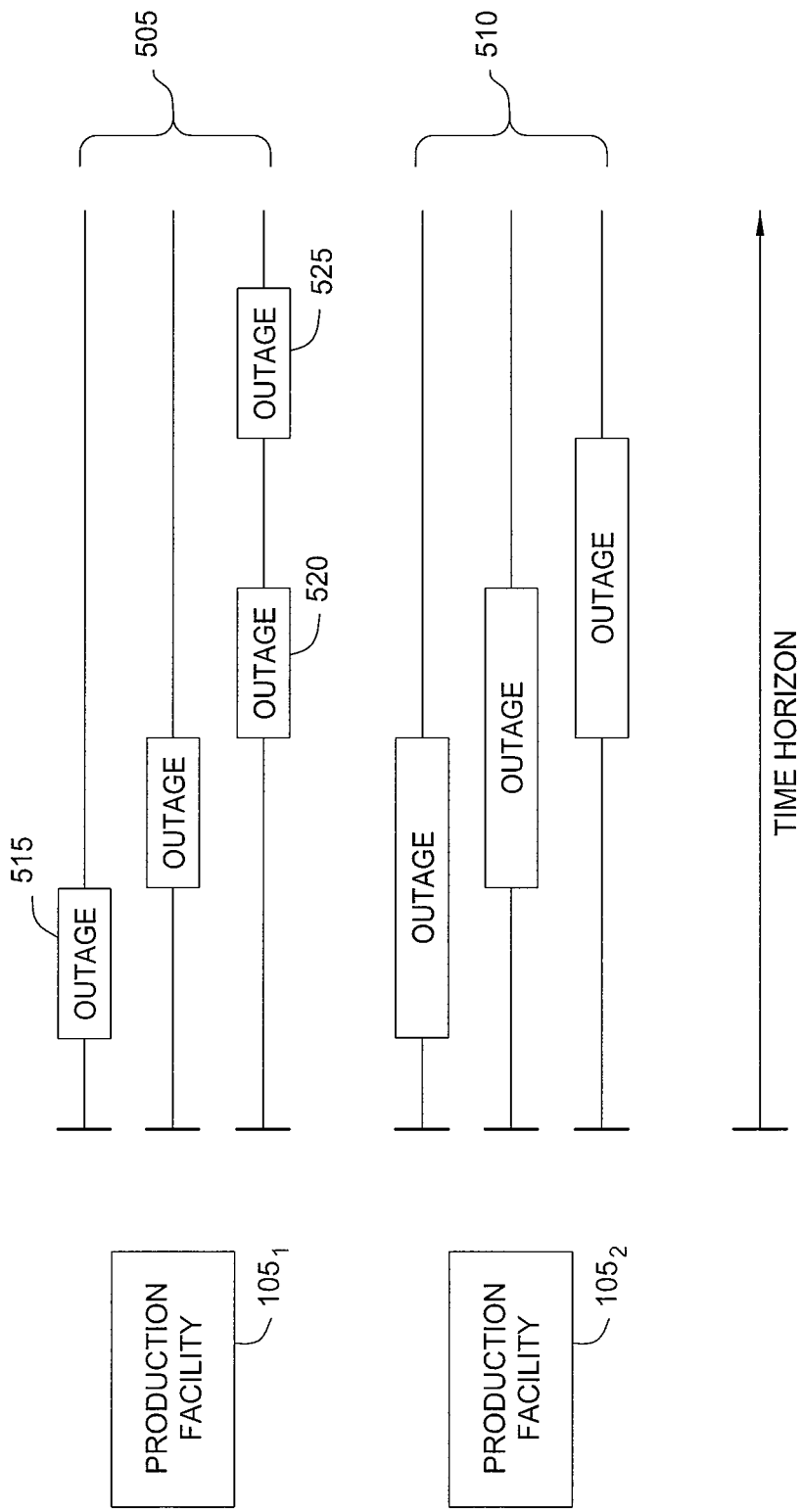
FIG. 5 illustrates different outage scenarios evaluated by the delivery scheduling application, according to one embodiment of the invention.

Using the historical data related to plant outage allows a set of outage scenarios 235 to be generated that represent different plausible plant outage possibilities. FIG. 5 illustrates an example of different outage scenarios 235, according to one embodiment of the invention. As shown, a set of three outage scenarios 505 are defined for production facility $105_1$ and a set of three outage scenarios 510 are defined for production facility $105_2$. In this example, a first scenario includes an outage 505 which occurs at production facility $105_1$ early in the delivery schedule represented by the time horizon. Note, as shown, outage 520 and 525 illustrate an example of an outage scenario that includes more than one outage period during the delivery schedule. Also, the outage periods of production facility $105_1$ are shorter than $105_2$, as noted, as the outage scenarios are generated based on statistics. Accordingly, in this example, outages at production facility $105_1$ have historically had a shorter duration than outages at production facility $105_2$. Once generated, the outage scenarios are evaluated against multiple potential delivery schedules 237 to determine how robust (i.e., how much additional cost) would result from a given schedule 237 if a given outage scenario 235 were to occur.

Figure 3:
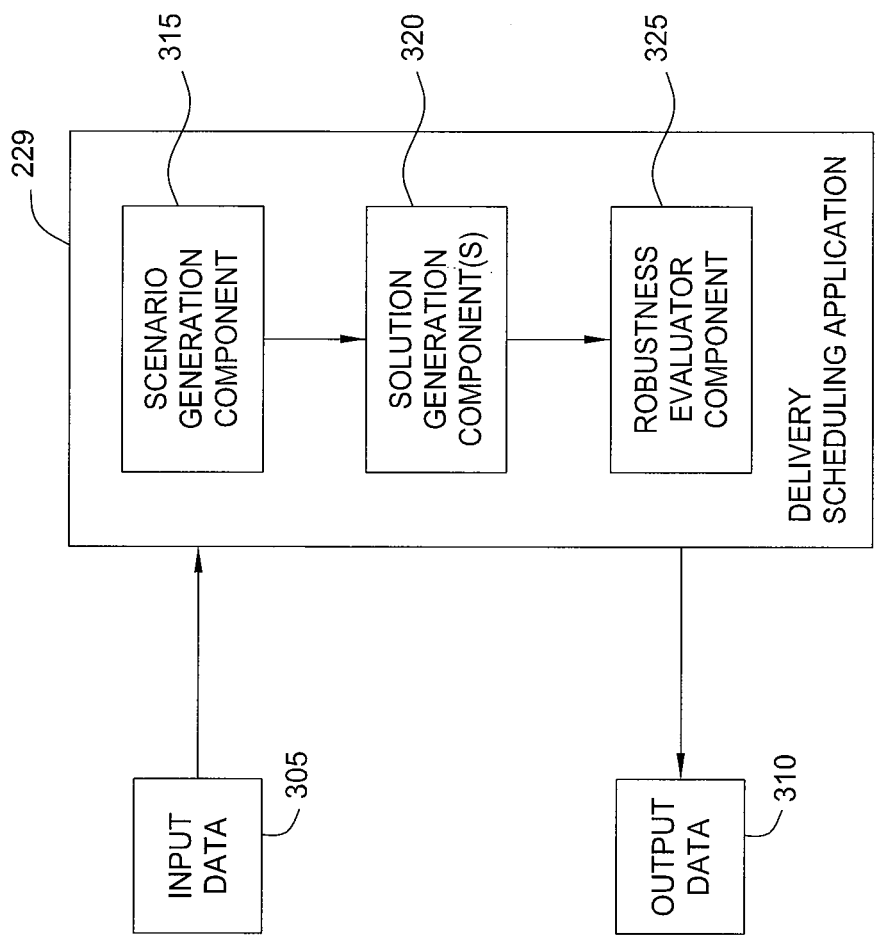
FIG. 3 further illustrates the delivery scheduling application first shown in FIG. 2, according to one embodiment of the invention.

FIG. 3 further illustrates the delivery scheduling application 227, according to one embodiment of the invention. As shown, the delivery scheduling application 227 includes a scenario generation component 315, a solution generation component 320 (or components), and a robustness evaluation component 325. In one embodiment, the scenario generation component 315 is configured to receive input data 305 and prepare it for processing by the solution generation component 320 and, subsequently, the robustness evaluation component 325. As noted, the input data 305 may describe the customers, trucks, and outage scenarios for a bulk delivery supply chain. For example, the input data may describe historical consumption rates, forecasted consumption requirements of each customer, any contractual requirements to provide a minimum delivery amount to a customer, current reserve product available at each production facility, reserves available at customer sites, storage capacity minimums and maximums at the production facilities and customers. Similarly, data regarding a delivery fleet may indicate truck capacities, fill and delivery times, estimated operational costs per kilometer, etc., and the outage data could describe historical outages at a given production facility. Of course other relevant information about a customer, product, delivery fleet, or outages may be included, as appropriate or helpful in a particular case.

The scenario generation component 315 may be configured to generate multiple outage scenarios, where each scenario includes a possible failure of one production facility during the delivery period represented by the input data. In this approach, no probabilities are assigned to an outage scenario. Doing so avoids focusing too much on high probability scenarios and too little on low probability scenarios. In one embodiment, the outage periods in a scenario are generated using random (or pseudorandom) selections. For example, the scenario generation component 315 may select a production facility at random and randomly select a beginning time and ending time for an outage at that production facility. However, the time maximum and/or minimum time for an outage may be guided by an analysis of actual data describing outage periods at a production facility.

The solution generation component 320 may be configured to generate a set of feasible solutions (delivery schedule) to the distribution problem, i.e., to the delivery requirements specified by the input data 305. The solutions may be generated such that each solution may be applied to any of the outage scenarios. In one embodiment, the solutions may be generated using the Greedy Algorithm to generate an initial, feasible solution. The initial solution is generated with certainty, meaning that the solution is generated with an assumption that no outage will occur during the delivery schedule. Then an improvement heuristic is used to modify the solution in different ways—resulting in a new solution. Generally, the heuristic employs a local search strategy to determine whether different small changes in the solution represent an improvement. By modifying parameters of the heuristic local search strategy, different solutions are generated from the initial one. For example parameters of the heuristic, such as computation time, the set of moves, and the random seed for the local search may all be modified. However, modifying the set of moves and computation time may result in poor solutions. At the same time, modifying the random seed of the local search is a preferred method to generate multiple solutions, as it is unlikely that some values of the random seed will yield substantially better results than others.

Another approach for generating a solution is to generate the initial solution with one of the outage scenarios as input data. In this way the initial solution may not be as good as the solutions generated with the modification heuristic, due to the outage. Still another approach is to modify the input data to add an additional production source or increase the stock of product available at production source (within the production and storage limits of a production facility). Of course, one of ordinary skill in the art will recognize that a variety of approaches other approaches could be used to generate a set of solutions (delivery schedules).

Once both the outage scenarios and delivery solutions are generated, the robustness evaluation component 325 may compute a cost for each solution, based on each outage scenario. In one embodiment, e.g., the robustness evaluation component 325 may evaluate the cost of each solution using the min max regret and min max deviation evaluation to compute a robustness of each one. The solution with the best cost versus robustness trade off is then selected as the two week-delivery schedule 229.

Figure 4:
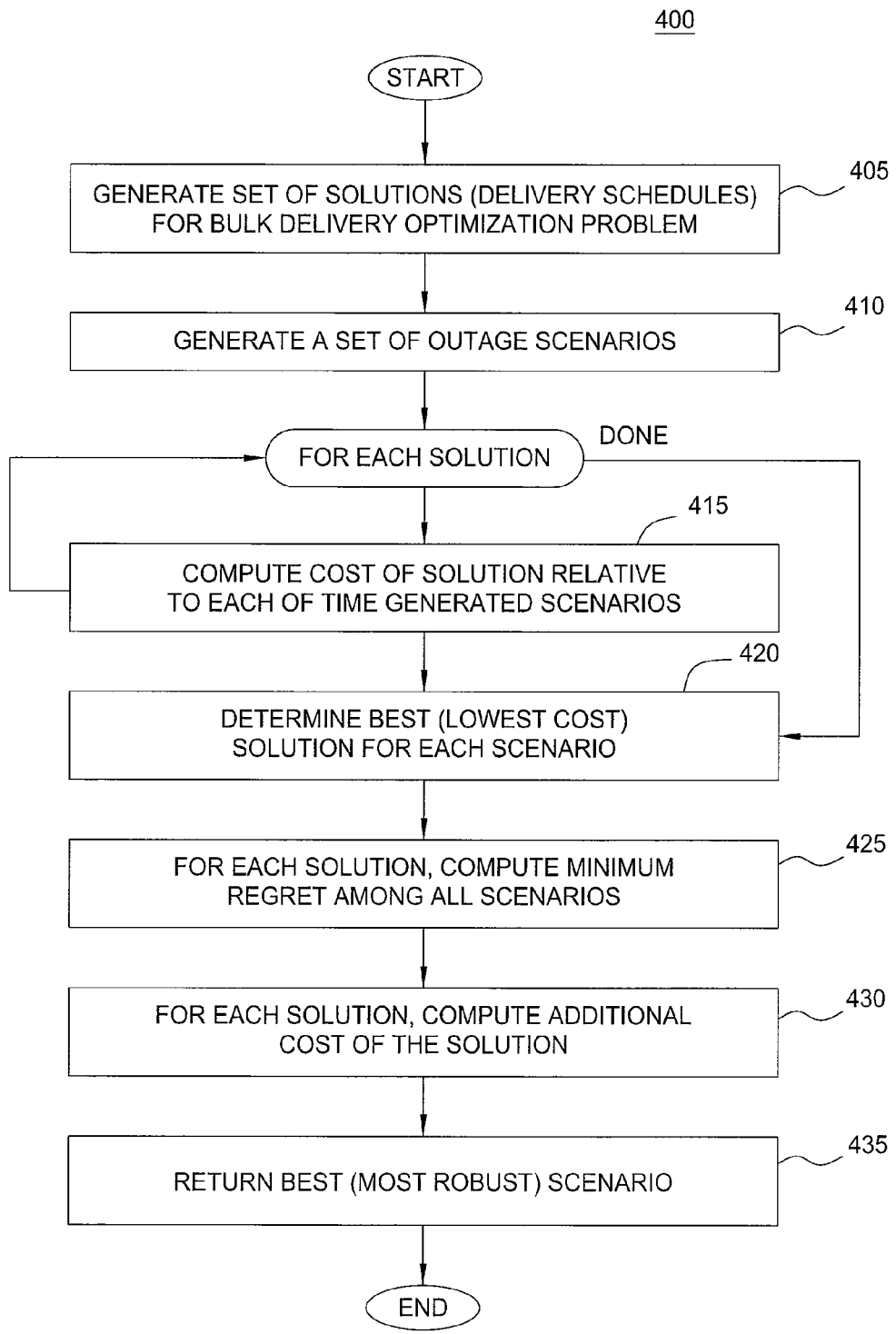
FIG. 4 illustrates a method for generating a delivery schedule for a bulk-gas distribution network, according to one embodiment of the invention.

FIG. 4 illustrates a method 400 for generating a delivery schedule for a bulk-gas distribution network, according to one embodiment of the invention. The operations of method 400 are described relative to the scenario generation component 315, a solution generation component 320 (or components), and a robustness evaluation component 325 illustrated in FIG. 3. As shown in FIG. 4, the method 400 begins at step 405, where the solution generation component 320 generates a set of solutions for a bulk delivery optimization problem. As noted above, in on embodiment, an initial solution may be generated using the Greedy Algorithm and modified solutions may be derived from the initial solution using a local search strategy. The solutions may be generated with certainty, meaning the solutions are generated with an assumption that no plant outages will occur for the delivery schedule represented by the solutions. At step 410, the scenario generation component 315 generates a set of outage scenarios, each representing a production outage for a given production facility. While the outages scenarios may be generated using random selections, minimum/maximum outage periods may be guided by historical data regarding the production facilities.

Once generated, the robustness evaluation component 325 evaluates the solutions against the outage scenarios to identify the most robust one. In one embodiment, the robustness evaluation component 325 computes a cost of each solution under each outage scenario (step 415). That is, each solution is evaluated relative to each of the outage scenarios to determine how the scenarios impact the cost of the solution. At step 420, the robustness evaluation component 325 may determine the solution with the best absolute performance for each respective outage scenarios. That is, the robustness evaluation component 325 identifies the solution that performs the best relative to a given outage scenario. However, this robustness provides no guaranty of the quality of the solution relative to any of the other outage scenarios. Accordingly, at step 425 the robustness evaluation component 325 may determine how well the solutions identified at step 420 perform relative to other outage scenarios.

In one embodiment, the robustness evaluation component 325 may compute a maximum regret or deviation among all scenarios. In the present context, regret can be defined as the difference between the resulting benefit of the solution chosen, and the benefit of the solution one would choose knowing exactly which scenario would occur (i.e., knowing that a particular outage scenario as going to occur). For example, the minmax decision rule may minimize the worst case deviation (or percentage deviation) from the best solution for each outage scenario (identified at step 420), among all the scenarios.

At step 430, the robustness evaluation component 325 may determine an additional cost for each solution for each outage scenario. That is, the component 325 determines how much additional cost is associated with a given solution, relative to a reference solution for each outage scenario. At step 435, the evaluation component 325 compares all the solutions and selects a pareto-optimal solution to return as a result of an optimization run. Generally, a solution (delivery schedule) is said to be pareto-optimal when no other solution has both a lower additional cost and a lower deviation.

Figure 6:
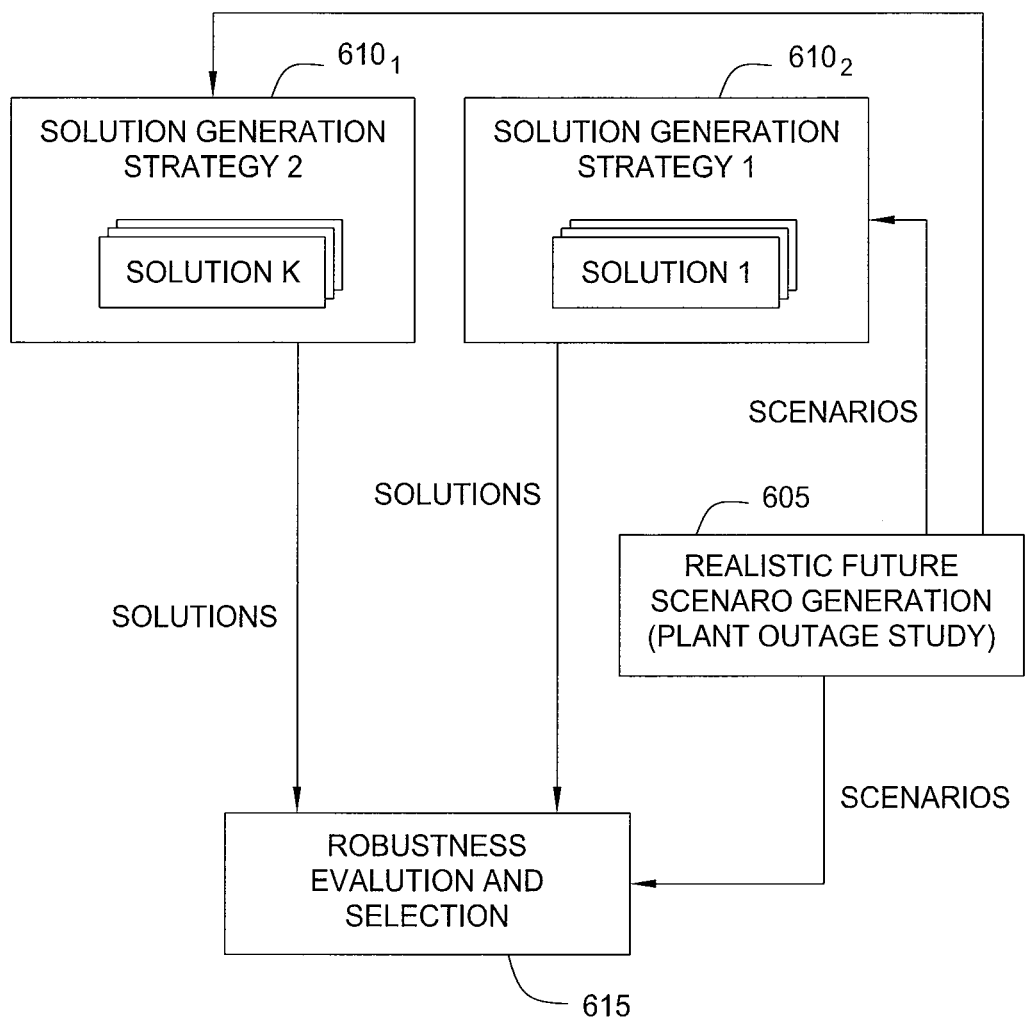
FIG. 6 illustrates an example workflow for a producer/distributor to organize a delivery schedule for a group of customers, according to one embodiment of the invention.

The operations of the method 400 are summarized in FIG. 6, which illustrates an example workflow 600 for a producer/distributor to organize a delivery schedule for a group of customers, according to one embodiment of the invention. As shown, the realistic future scenarios 605 are generated to represent possible plant outages (without regard for the probability of a given outage scenario actually occurring). The resulting scenarios are passed to solution generation strategies $610_{1-2}$, which generates a set of feasible solutions such that each solution is feasible (i.e., solutions which satisfies delivery requirements, as well as production, storage, and delivery capacities) when applied to any of the outage scenarios. Lastly, the costs of each solution applied to each scenario is computed (i.e., the cost of the solution without outages is compared to the cost of the solution with the outage specified by a given scenario). A mimmax regret and minmax deviation evaluation method may be used to compute the robustness of each solution. The solution with the best cost versus robustness trade off is selected.

Thus, advantageously, embodiments of the invention provide a computer-implemented delivery planning application configured to generate a schedule (e.g., a two-week schedule) for delivering a commodity product to multiple customers (e.g., bulk delivery of industrial gases). A producer (or distributor) may periodically use the delivery planning application to create a robust delivery schedule, which, in turn, reduces overall delivery costs when unplanned outages occur. More specifically, embodiments of the invention increase the robustness of optimization solutions for bulk gas distribution relative to uncertain events such as unexpected plant outages. The methods actively consider different assumptions regarding unexpected plant outages while searching for a solution (i.e., when generating a delivery schedule).

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method for generating a robust delivery schedule for delivering a commodity product to a set of customers, the method comprising:

generating, by operation of at least one computer processor, one or more production outage scenarios based on historical production facility outage data, wherein each production outage scenario specifies a period of time during which a first one of one or more production facilities is presumed to be unavailable to produce the commodity product, wherein the commodity product comprises industrial gases delivered to a storage tank at each customer site via at least one delivery truck;

generating a set of solutions, wherein each solution specifies a delivery schedule for delivering the commodity product to the set of customers;

determining a cost for each solution relative to each generated scenario;

evaluating the cost of each solution according to a specified evaluation method to compute a robustness measure for each solution, wherein the robustness measure is determined based an expected change in the cost of the solution relative to the one or more production outage scenarios; and returning, as the robust delivery schedule, a solution having a best determined cost versus robustness measure tradeoff, relative to other solutions in the generated set of solutions.

2. The method of claim, 1 further comprising, receiving a set of input data describing distribution requirements for delivering the commodity product to the set of customers, from the one or more production facilities.

3. The method of claim 1, wherein the specified evaluation method includes a minmax regret and minmax deviation method.

4. The method of claim 3, wherein the measure of robustness of a given solution is measured relative to a deviation from an identified reference solution determined for each of the outage scenarios.

5. The method of claim 1, wherein generating the set of solutions comprises:

generating an initial solution according to a Greedy Algorithm; and generating additional solutions by modifying the initial solution according to a local search strategy.

6. A non-transitory computer-readable storage medium containing a delivery scheduling application, which when executed on a processor performs an operation for generating a robust delivery schedule for delivering a commodity product to a set of customers, the operation comprising:

generating one or more production outage scenarios based on historical production facility outage data, wherein each production outage scenario specifies a period of time during which a first one of one or more production facilities is presumed to be unavailable to produce the commodity product, wherein the commodity product comprises industrial gases delivered to a storage tank at each customer site via at least one delivery truck;

generating a set of solutions, wherein each solution specifies a delivery schedule for delivering the commodity product to the set of customers;

determining a cost for each solution relative to each generated scenario;

evaluating the cost of each solution according to a specified evaluation method to compute a robustness measure for each solution, wherein the robustness measure is determined based an expected change in the cost of the solution relative to the one or more production outage scenarios; and returning, as the robust delivery schedule, a solution having a best determined cost versus robustness measure tradeoff, relative to other solutions in the generated set of solutions.

7. The computer-readable storage medium of claim 6, wherein the operation further comprises, receiving a set of input data describing distribution requirements for delivering the commodity product to the set of customers, from the one or more production facilities.

8. The computer-readable storage medium of claim 6, wherein the specified evaluation method includes a minmax regret and minmax deviation method.

9. The computer-readable storage medium of claim 8, wherein the measure of robustness of a given solution is measured relative to a deviation from an identified reference solution determined for each of the outage scenarios.

10. The computer-readable storage medium of claim 6, wherein generating the set of solutions comprises:
   generating an initial solution according to a Greedy Algorithm; and
   generating additional solutions by modifying the initial solution according to a local search strategy.

11. A system, comprising:
   a processor; and
   a memory storing a delivery scheduling application, which when executed on the processor performs an operation for generating a robust delivery schedule for delivering a commodity product to a set of customers, the operation comprising:
      generating one or more production outage scenarios based on historical production facility outage data, wherein each production outage scenario specifies a period of time during which a first one of one or more production facilities is presumed to be unavailable to produce the commodity product, wherein the commodity product comprises industrial gases delivered to a storage tank at each customer site via at least one delivery truck,
      generating a set of solutions, wherein each solution specifies a delivery schedule for delivering the commodity product to the set of customers,
      determining a cost for each solution relative to each generated scenario,
      evaluating the cost of each solution according to a specified evaluation method to compute a robustness measure for each solution, wherein the robustness measure is determined based an expected change in the cost of the solution relative to the one or more production outage scenarios, and
      returning, as the robust delivery schedule, a solution having a best determined cost versus robustness measure tradeoff, relative to other solutions in the generated set of solutions.

12. The system of claim, 11 wherein the operation further comprises, receiving a set of input data describing distribution requirements for delivering the commodity product to the set of customers, from the one or more production facilities.

13. The system of claim 11, wherein the specified evaluation method includes a minmax regret and minmax deviation method.

14. The system of claim 13, wherein the measure of robustness of a given solution is measured relative to a deviation from an identified reference solution determined for each of the outage scenarios.

15. The system of claim 11, wherein generating the set of solutions comprises:
   generating an initial solution according to a Greedy Algorithm; and
   generating additional solutions by modifying the initial solution according to a local search strategy.

* * * * *